(12) United States Patent
White

(10) Patent No.: US 7,062,225 B2
(45) Date of Patent: *Jun. 13, 2006

(54) PEDOMETER SYSTEM AND METHOD OF USE

(75) Inventor: Russell W. White, Austin, TX (US)

(73) Assignee: Affinity Labs, LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/917,065

(22) Filed: Aug. 12, 2004

(65) Prior Publication Data

US 2005/0197063 A1 Sep. 8, 2005

Related U.S. Application Data

(63) Continuation of application No. 10/794,137, filed on Mar. 5, 2004.

(51) Int. Cl.
*H04B 5/00* (2006.01)
(52) U.S. Cl. .................. 455/41.2; 455/41.1; 455/550.1; 455/553.1; 600/300; 600/309; 600/316; 600/365
(58) Field of Classification Search ............... 455/41.1, 455/41.2, 556.1, 556.2, 550.1, 553.1; 600/300, 600/309, 316, 365
See application file for complete search history.

(56) References Cited

U.S. PATENT DOCUMENTS

| 4,053,755 | A | 10/1977 | Sherrill |
|---|---|---|---|
| 4,223,211 | A | 9/1980 | Allsen et al. |
| 4,322,609 | A | 3/1982 | Kato |
| 4,337,938 | A | 7/1982 | Rodriguez |
| 4,371,945 | A | 2/1983 | Karr et al. |
| 4,460,823 | A | 7/1984 | Ruehlemann |
| 4,649,552 | A | 3/1987 | Yukawa et al. |
| 4,651,446 | A | 3/1987 | Yukawa et al. |
| 4,771,394 | A | 9/1988 | Cavanagh |
| 4,855,942 | A | 8/1989 | Bianco |
| 5,065,414 | A | 11/1991 | Endou et al. |
| 5,117,444 | A | 5/1992 | Sutton et al. |
| 5,164,967 | A | 11/1992 | Endou et al. |
| 5,475,725 | A | 12/1995 | Nakamura |
| 5,556,003 | A | 12/1998 | Sham et al. |

(Continued)

OTHER PUBLICATIONS

"Philips EXP521," PC Authority Reviews, Oct. 8, 2003, 1 pg.

(Continued)

*Primary Examiner*—Matthew Anderson
*Assistant Examiner*—Sanh Phu
(74) *Attorney, Agent, or Firm*—Russell W. White

(57) ABSTRACT

A pedometer system and method of use are disclosed that assist a user in monitoring an athletic endeavor. A system that incorporates teachings of the present disclosure may include, for example, a pedometer housing component at least partially defining an enclosure. A local area wireless transceiver capable of receiving a signal from a motion sensor may be located within the enclosure. A performance engine may also be located within the enclosure and may be communicatively coupled to the local area wireless transceiver. In operation, the performance engine may utilize the signal from the motion sensor to generate a performance metric like average speed or distance traveled. The system may also include an output mechanism such as an audio device capable of presenting the performance metric to a user in an audible message. A device embodying the performance engine may also embody an audio file player such as an MP3 player.

8 Claims, 3 Drawing Sheets

U.S. PATENT DOCUMENTS

| | | |
|---|---|---|
| 5,844,960 A | 12/1998 | Sham et al. |
| 5,891,042 A | 4/1999 | Sham et al. |
| 5,976,083 A | 11/1999 | Richardson et al. |
| 6,094,844 A | 8/2000 | Potts |
| 6,132,391 A | 10/2000 | Onari et al. |
| 6,135,951 A | 10/2000 | Richardson et al. |
| 6,145,389 A | 11/2000 | Ebeling et al. |
| 6,175,608 B1 | 1/2001 | Pyles |
| 6,213,872 B1 | 4/2001 | Harada et al. |
| 6,254,513 B1 | 7/2001 | Takenaka et al. |
| 6,302,789 B1 | 10/2001 | Harada et al. |
| 6,334,848 B1 | 1/2002 | Wong et al. |
| 6,349,126 B1 | 2/2002 | Ogawa et al. |
| 6,434,212 B1 | 8/2002 | Pyles |
| 6,473,483 B1 | 10/2002 | Pyles |
| 6,506,142 B1 | 1/2003 | Itoh et al. |
| 6,546,336 B1 | 4/2003 | Matsuoka et al. |
| 6,594,617 B1 | 7/2003 | Scherzinger |
| 6,658,079 B1 | 12/2003 | Macklin et al. |
| 6,674,832 B1 | 1/2004 | Yusa |
| 6,696,956 B1 * | 2/2004 | Uchida et al. ........... 340/573.1 |
| 6,716,139 B1 | 4/2004 | Hosseinzadeh-Dolkhani et al. |
| 2003/0071791 A1 * | 4/2003 | Hanson et al. .............. 345/169 |
| 2003/0208113 A1 * | 11/2003 | Mault et al. ................. 600/316 |
| 2004/0110526 A1 * | 6/2004 | Volland ................... 455/550.1 |
| 2004/0140348 A1 * | 7/2004 | Fromm ....................... 235/105 |
| 2004/0199056 A1 * | 10/2004 | Husemann et al. ......... 600/300 |
| 2004/0224718 A1 * | 11/2004 | Chen ....................... 455/553.1 |
| 2004/0225796 A1 * | 11/2004 | Hanson et al. .............. 710/301 |
| 2004/0236199 A1 * | 11/2004 | Hawthorne et al. ......... 600/345 |

OTHER PUBLICATIONS

"Philips PSA 128MAX," PC Authority Reviews, May 1, 2003, 1 pg.

"Sony Network Walkman NW-MS70D," PC Authority Reviews, Oct. 8, 2003, 1 pg.

"Targa TMU-401," PC Authority Reviews, Oct. 8, 2003, 1 pg.

"Targa TMU-604," PC Authority Reviews, Oct. 8, 2003, 1 pg.

"Acer MF-360," PC Authority Reviews, Oct. 8, 2003, 1 pg.

"Apacer NV400," PC Authority Reviews, Oct. 8, 2003, 1 pg.

"Apple iPod 40GB," PC Authority Reviews, Oct. 8, 2003, 1 pg.

"Creative CD-MP3 M100," PC Authority Reviews, May 1, 2003, 1 pg.

"Creative Nomad Jukebox Zen NX," PC Authority Reviews, Sep. 10, 2003, 2 pp.

"IRIVER IMP-400," PC Authority Reviews, May 1, 2003, 1 pg.

"iRiver—SlimX imp-550," PC Authority Reviews, Oct. 8, 2003, 1 pg.

"M-Any Dual-Play 128," PC Authority Reviews, May 1, 2003, 1pg.

"NC SSF-302," PC Authority Reviews, Oct. 8, 2003, 1 pg.

"Philips EXP322," PC Authority Reviews, Oct. 8, 2003, 1 pg.

* cited by examiner

PEDOMETER SYSTEM AND METHOD OF USE

CROSS REFERENCE TO RELATED APPLICATION

This is a continuation application of U.S. patent application Ser. No. 10/794,137 filed on Mar. 5, 2004, the contents of which are expressly incorporated herein by reference in its entirety.

FIELD OF THE INVENTION

The present disclosure relates generally to athletic equipment, and more particularly, to a pedometer system and method of use.

BACKGROUND

Many bicyclists make use of bicycle computers that act as speedometers, odometers, and cadence counters. These devices typically receive information from sensors mounted with respect to the moving elements of a bicycle and convert this information into a bike speed value or some other desired metric. Many of these conventional bicycle computers are special purpose devices that have a display and are fixed to the handlebars of a bicycle to allow a rider to view displayed information while riding.

In addition to the bicycle-related information mentioned above—namely speed, distance, and cadence—some conventional bicycle computers may also display the current time and/or heart rate information for the rider. While these conventional systems represent a nice option for many cyclists, these systems have several shortcomings.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Figure 1:
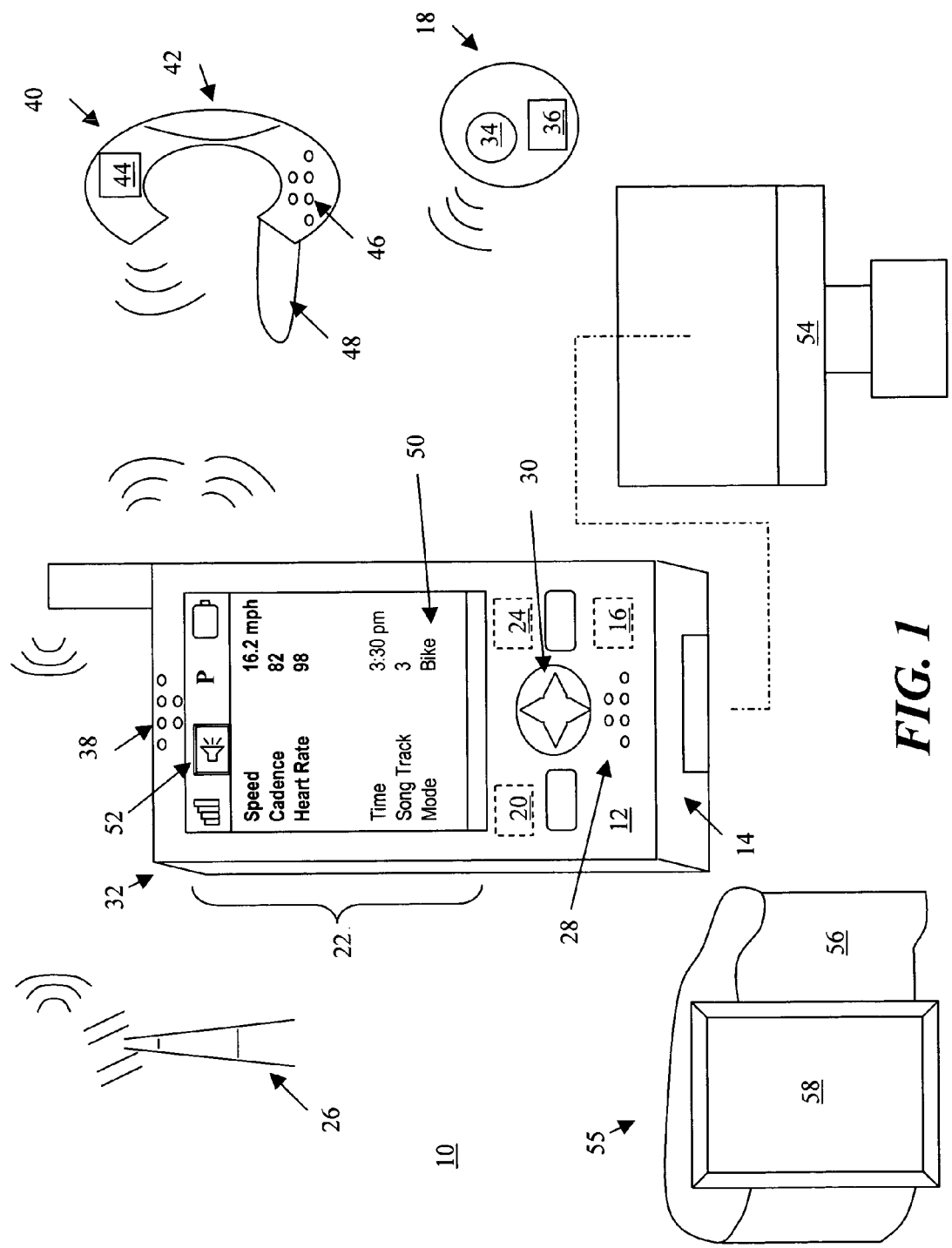
FIG. 1 shows one embodiment of a cycling information system that incorporates teachings of the present disclosure.

Embodiments discussed below describe, in part, different approaches for monitoring athletic performance. Though many of the embodiments discussed below focus on systems in which the athletic performance includes bicycling, other activities may also be monitored in accordance with the teachings disclosed herein. For example, runners may benefit from the systems and processes described below. A runner and/or walker may employ the teachings disclosed herein to provide an improved pedometer that may, for example, display steps taken, provide customized distance and calories burned calculations, and include time/date information and/or a stopwatch feature. In some cases, a pedometer may show personalized distance covered and calories burned information, which may have been calculated by taking into account a user's stride length and/or weight.

In several embodiments, a computing device is used as part of the monitoring system, and this computing device is described as having wide area wireless communication functionality. For example, the device may be capable of acting as a cellular telephone or some other wireless communication device, including, for example, other telephonic devices, smart telephones, personal digital assistants (PDA's), or Blackberry™-like electronic mail devices. Including some wide area communication capability in performance tracking computing devices may provide athletes with a cost effective and convenient way to protect themselves.

As mentioned above, cycling is an example of an athletic activity that may be monitored. In practice, prudent cyclists may elect to carry a wireless telephone with them while cycling. If a tire goes flat, if the cyclist has or witnesses an accident, and/or if someone needs to get a hold of the cyclist, the wireless telephone may prove invaluable. Such a prudent cyclist may elect to carry the telephone in a pocket located on the back of his or her cycling jersey or a catch-all bag located on the seat post under the saddle. Many cyclists consider either location to be sub-optimal. Carrying the phone in the jersey pocket may be annoying and may make it difficult to know if someone is calling. While using a catch-all bag may remove some of the annoyance, it may also make it even more difficult to know if someone is calling.

Many of the same cyclists that bring a telephone with them on long rides may also have a bicycle computer fixed to the handlebars of their bike. The cyclist may have paid hundreds of dollars for the telephone and hundreds of dollars for the computer. And, by fixing the computer to the bicycle, the cyclist may unwittingly enhance the likelihood that the computer is stolen. If, for example, the cyclist leaves the bicycle unattended for some period of time, the cyclist may return to find the computer missing.

By employing the teachings disclosed herein, cyclists may able to choose a bike computer that has wide area wireless communication capabilities. In some embodiments, the bicycle computers may actually be embodied in cellular telephones or other wireless communication devices. For example, a system incorporating teachings of the present disclosure may provide a cradle securable to a bicycle and capable of releasably coupling with a wireless telephone that has bicycle computer capabilities. The cradle may provide a better place for carrying a telephone while cycling. The cradle may also make it easier for cyclists to leave their bike unattended without fear of having their bicycle computer stolen. Cyclists may simply disengage their telephones from the cradle and take the phones with them.

In some embodiments, the cradle may also be capable of triggering the telephone to switch into a bike computer mode and further capable of facilitating communication of bike information from a sensor to the telephone. For example, the cradle may be physically connected or wired to one or more sensors tracking the movement of a bicycle component. By cradling the telephone, the information communicated from sensors to the cradle may be passed along to a processor in the telephone. In addition to the many above-referenced advantages, incorporating communication capabilities into a bicycle computer may also save the cyclists money—they no longer need both a computer and a telephone.

As mentioned above, FIG. 1 shows one embodiment of a cycling information system 10 that incorporates teachings of the present disclosure. As depicted, system 10 may include, for example, a housing component 12 at least partially defining an enclosure 14. A local area wireless transceiver 16 capable of receiving a signal from a sensor 18 coupled to a bicycle (not shown) may be located within enclosure 14. A performance engine 20 may also be located within enclosure 14 and may be communicatively coupled to local area wireless transceiver 16. In operation, performance engine 20 may utilize a signal from sensor 18 to generate a performance metric like current speed, distance traveled, or cadence.

To facilitate communication of performance metric information to a user, system 10 may also include an output mechanism such as display device 22 associated with the housing component. An output mechanism like display device 22 may be capable of presenting the performance metric to a user. In preferred embodiments, the system may also include a wide area wireless transceiver 24 located within enclosure 14. Wide area wireless transceiver 24 may allow the user to send and receive information across a geographically disperse network such as a cellular telephone network. In operation, a user may want to place a telephone call and may use transceiver 24 to "connect" to a cellular network node 26. This "connection" may involve Radio Frequency (RF) communication that complies with some wide-area RF technology like CDMA, GPRS, EDGE, or 3GSM.

Whatever the form factor of the computing device, a user may want the device to be rugged. A typical cellular telephone, for example, may not handle the abuse generated while running, cycling, and/or performing some other activity. As such, a cellular telephone incorporating teachings of the present disclosure may enjoy a more rugged and/or water resistant design. Additionally, a user may desire to interact with the device and may do so using one or more of several types of input mechanisms including, for example, a microphone 28, a touch screen, keypad, and toggle disks 30. In operation, a microphone assembly 28 associated with computing device 32 may be capable of receiving voice commands, a mouse mechanism (not shown) may allow a user to point and click icons on a display screen, and/or a touch screen may facilitate receiving inputs from a stylus.

Depending on implementation detail, computing device 32 may have any of several components located within enclosure 14. For example, computing device 32 may include a microprocessor and a memory located within its cavity. In some embodiments, the memory may hold an application that embodies the performance engine and converts information received via one or more remote sensors like sensor 18 into a performance metric like speed, distance, cadence, etc. As shown, sensor 18 may include a pick-up 34 that "recognizes" movement of a bicycle component. Pick-up 34 may be tracking wheel revolutions, crank revolutions, front and/or rear derailer motion, bike and/or body tipping, and/or some combination thereof. The tracking mechanism of pick-up 34 may take several forms. It may be optical, magnetic, mechanical, etc. To facilitate presentation of performance metric information to the user, sensor 18 may include a local area wireless communication module 36, which may make use, for example, of Bluetooth technology. Sensor 18 may also rely on wired connections in addition and/or in lieu of wireless connections to communicate with device 32.

As mentioned above, a bicycle computer like computing device 32 may include any of several different components. For example, it may have a wireless wide area transceiver 24, which may be part of a multi-device platform for communicating data using RF technology across a large geographic area. The platform may be a GPRS, EDGE, or 3GSM platform, for example, and may include multiple integrated circuit (IC) devices or a single IC device. Similarly, bicycle computer 32 may have a wireless local area transceiver 16, which may communicate using spread-spectrum radio waves in a 2.4 GHz range, 5 GHz range, or other suitable range. Wireless local area transceiver 16 may also be part of a multi-device or single device platform and may facilitate communication of data using low-power RF technology across a smaller geographic area.

For example, if wireless local area transceiver 16 includes a Bluetooth transceiver, the transceiver may have a communication range having approximately a one hundred foot radius. If the wireless local area transceiver includes an 802.11(x) transceiver, such as an 802.11(b) or Wi-Fi transceiver, the transceiver may have a communication range having approximately a one thousand foot radius.

One skilled in the art will also recognize that wireless local area transceiver 16 and wireless wide area transceiver 24 may be separate or part of the same chipset. For example, a bike computer chipset may package a Bluetooth, an 802.11(b), and a GSM cellular technology, like GPRS, into a single chipset. In many embodiments, the bike computer may also include display device 22, which may be operable to present a graphical user interface (GUI) to a user. In an embodiment where the bike computer can also operate as a telephone, the telephone may include a speaker assembly 38. The telephone may also be executing a local software application to allow the telephone to receive an input indicating a desire to toggle from a telephone mode to a bike computer mode. In such an embodiment, the bike computer may include a computer-readable medium having computer-readable data to direct a wireless telephone processor to receive a signal from a sensor indicating some physical activity, to utilize the signal to generate a performance metric, and to initiate presentation of a rendering of the performance metric on a display device.

In some embodiments, a bike computer like device 32 may include a global positioning system (GPS) component that facilitates location-based and tracking functionality. Device 32 may also include a Bluetooth module that sniffs for other Bluetooth-enabled devices. This sniffing may allow device 32 to "find" sensor 18. It may also allow device 32 to find headset 40. If device 32 recognizes a headset or athletic activity sensor as a Bluetooth-enabled device, device 32 may engage in a process to "pair" with the identified device(s).

In an embodiment that includes a headset like headset 40, it may be advantageous to enhance computing device 32 by adding a built in audio player capable of playing a playable file format like .WAV, MP3, MIDI, .AU, and/or some other format. As such, a cyclist or other athlete may be able to listen to music via headset 40 while performing. In practice, device 32 may be simultaneously functioning: as a bike computer—displaying information like speed and cadence; as an MP3 player—outputting music or other audio signals to the user; and, as a wireless communication device—providing the user with the ability to send and receive information.

In practice, headset 40 may include a battery 42, wireless transceiver 44, a speaker assembly 46, and a microphone assembly 48. Though system 10 includes a device 32 with a display 22, which facilitates the communication of performance information to the user, some systems may elect to enhance and/or replace the visual presentation approach with an audible or speech based interface. As such, a user may be able to "ask" device 32 a question by speaking into microphone assembly 48. For example, a user may ask "what is my current cadence?", and device 32 may respond with "your cadence is 82."

Such features may simplify operation of a device like device 32. Additional ease of use may be added by including various GUI icons on display 22. For example, GUI icon 50 may be used to indicate that device 32 is in bike computer mode, and GUI icon 52 may be used to indicate that device 32 has recognized the existence of an incoming call. As such, a user listening to music from device 32 on headset 40 may have the option of pausing the music and answering the telephone call.

Though described above in a cycling application where device 32 can be cradled in cradle 54, device 32 may also be used by runners and other sport enthusiasts. Device 32 may receive and/or generate a signal indicating that a step has been taken by a user and convert this signal into a presentable sport's metric. Occasionally, a user may not want to utilize cradle 54. The user may want some level of flexibility in locating device 32. A user may, for example, want to secure device 32 to an arm with a mounting system 55, which may include an elastic strap 56 and a rubberized device holder portion 58. The strap and holder portion may be formed of other materials and may include some clasping mechanism. In some embodiments, device 32 may have some sensitivity to moisture, and the mounting portion may surround device 32—insulating device 32 from contacting the user's skin, while providing sufficient support and access to some or all of the Input/Output mechanisms of device 32.

As described above, device 32 may operate as a bicycle computer, an MP3 player, and a cellular telephone. As such, device 32 may be very attractive to an avid cyclist. If the cyclist elects to take up running or begins training for a triathlon, the cyclist may want device 32 to be expandable—to be capable of accepting new and/or different performance monitoring functions or modules. The cyclist turned triathlete may now want device 32 to operate as a pedometer. The cyclist may also want to add other useful features to device 32. For example, a cyclist may want device 32 to act as a garage door opener. If the cyclist begins a ride from home and stores her bicycle in the garage, the cyclist may want to close the garage door behind her. As such, the cyclist may want device 32 to act as a garage door remote—communicating an open and/or close RF signal to a garage door opener.

As mentioned above, bike computer 32 may include or be capable of executing software applications, which may be coded, for example, as a BREW application or a Java application. In some embodiments, the bike computer functionality may be implemented by a Java application that was downloaded over the air and may be executing on a computing device's operating system (OS), which may be a Symbian OS, Pocket PC, Linux-based, a Palm OS, or other suitable computing device OS.

As an example of one potential application/OS combination, a developer may decide to develop a Java-based bike computer application for a Symbian OS-based computing device, which may be a cellular telephone or smart phone. The process of developing a Java application for the Symbian platform may include three main steps: (1) developing the Java code and supporting files, sound graphics, etc. which may, in some cases, be tested on an emulator; (2) creating the files to deploy the application to a Symbian interface so that it has a GUI icon and can be run from a native interface; and (3) packaging the application elements in a release file.

As indicated above, smart client applications may be written in Java and run on a wide range of devices. For a smart client application with Java on the client device, there may be two preferred options of Java platforms: Java 2 Standard Edition (J2SE) and Java 2 Micro Edition (J2ME). Applications based on J2SE are often standalone Java applications, usually using Personal Java. Personal Java is a subset of J2SE with a smaller Java Runtime Environment (JRE) suitable for the limited storage capacity of hand-held computing devices. Java Virtual Machines (JVMs) based on J2SE may be available for a wide variety of client devices including Pocket PC, Symbian OS, Linux and Palm OS devices.

In some embodiments, a bike computer file or application may be based on a smaller version of the java platform, like MIDP, which may be better for small footprint devices like cellular handsets. Java applications that run on MIDP devices are called MIDlets, and a MIDlet suite is a grouping of MIDlets that can share resources at runtime. A suite usually includes at least two separate files. The first may be a Java Application Descriptor (JAD), which may be a file that tells the Application Management Software (AMS), the piece of software on the hardware responsible for managing J2ME applications, how to handle the controller application. The JAD file may provide instructions for, among other things, installation, identification, and retrieval. The second may be a Java Archive (JAR), which may be a collection of the controller application's compiled byte classes, resources, and manifest files.

Occasionally and as mentioned above, a user may have an existing cellular telephone and may want to download a bike computer application capable of "turning" the cell phone into a bike computer. This application may, in some cases, be downloadable Over The Air (OTA) from a Web server-like environment. As such, users may be able to "HTTP" their way to the URL where the JAD file resides. In such embodiments, a computing device-side browser may download the bike computer application into the Applications folder and test it.

Figure 2:
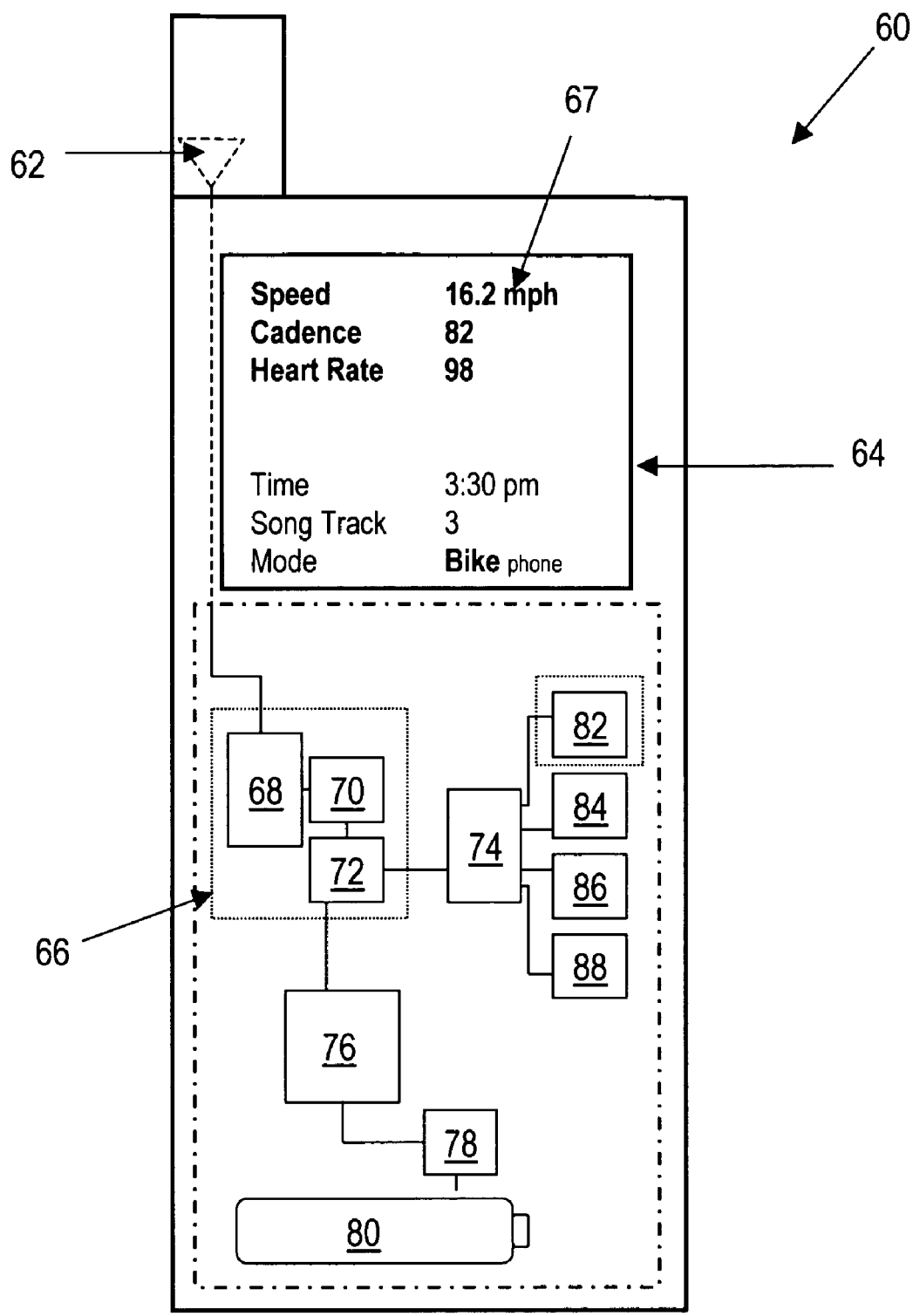
FIG. 2 illustrates a cut away view of a cellular telephone incorporating teachings of the present disclosure in order to act as a computing device for monitoring athletic activity.

A more detailed picture of a wireless enabled device 60 that may be operable as a bicycle computer is shown in FIG. 2. As described above in the brief description of the figures, FIG. 2 depicts a cut away view of a cellular telephone incorporating teachings of the present disclosure in order to act as a computing device for monitoring athletic activity. To operate as an athletic monitor, telephone 60 may be a ruggedized phone designed for athletes. It may have better water resistant capabilities and handle impacts and jostling better than other telephones. Telephone 60 may have a clam-shell design or a "candy bar" design as shown. Though not shown in FIG. 2, telephone 60 may also include special branding and/or markings to indicate that it is an "Athlete" phone. For example, a cellular telephone manufacturer may elect to place an Ironman™ logo on the phone or some other appropriate logo to let user's know that the phone is athlete-ready or capable of operating in a performance monitoring mode.

In the depicted embodiment, telephone 60 includes several integrated circuits on a circuit board, an antenna 62, and a liquid crystal display 64 presenting a bicycle computer display image 67. The components of telephone 60 could include any of several combinations of components. As depicted, telephone 60 includes a wide area wireless platform 66, which may be, for example, a GPRS and/or CDMA module. As shown, platform 66 includes a wide area wireless transceiver 68, front end circuitry 70, and dual core processor 72. Front end circuitry 70 may help ensure that the baseband electronics will work well with transceiver 68. Dual core processor 72 may include, for example, a Digital Signal Processing (DSP) core as well as RISC or ARM capabilities. In some embodiments, the components of telephone 60 may use dedicated hardware and DSP firmware to help provide advanced functionality.

Platform 60 may be communicatively coupled to an application engine 74, which could be, for example, a Dragonball processor, and a power circuit 76, which may manage among other things a battery circuit 78. In some embodiments, battery circuit 78 may keep track of the power available from battery 80. Application engine 74 may be communicatively coupled to several different components and may provide those components with additional processing capabilities. Example components may include a local area RF transceiver 82, which may be Bluetooth-enabled, Wi-Fi enabled, etc. Other components might be an image sensor 84, memory module 86, and peripheral controller 88, which may manage keypad, LCD, CODEC, IrDA, and other functionality. One skilled in the art will recognize that the many of the above described components could be combined or broken out into other combinations and that the memory could include onboard and added memory components including RAM, Flash, smart media, and others.

Figure 3:
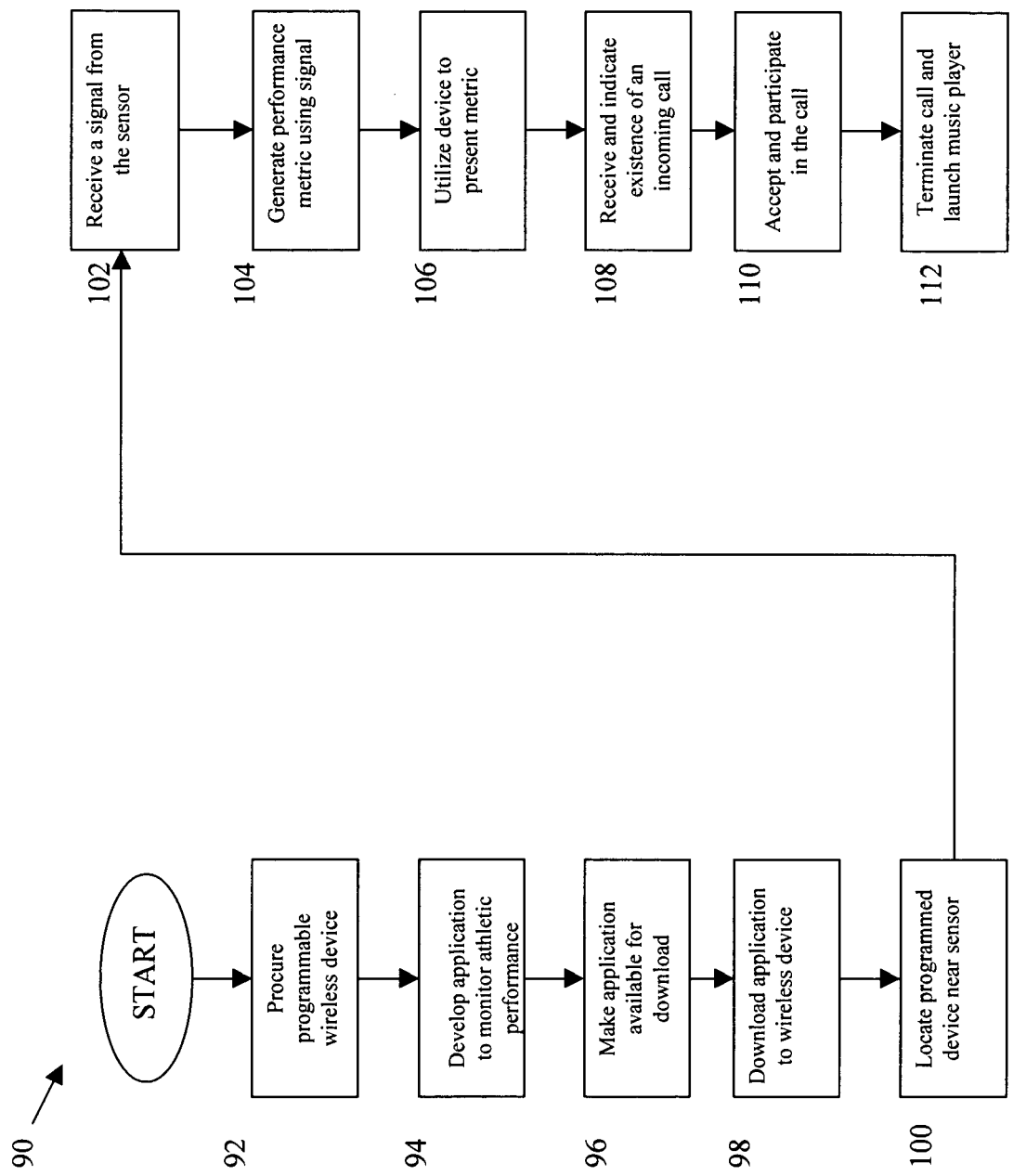
FIG. 3 presents a flow diagram for a cycling performance tracking process incorporating teachings of the present disclosure.

As mentioned above, FIG. 3 presents a flow diagram for a cycling performance tracking process 90 incorporating teachings of the present disclosure. At step 92, a manufacturer, programmer, and/or user may procure a programmable wireless device. An application for monitoring athletic performance may be developed at step 94. The athletic performance may include cycling, running, swimming, lifting, etc. In some embodiments, the application may be made available, at step 96, for download from the Public Internet, over the air via a wireless network, from a local computer, or in some other manner.

At step 98, the application may be loaded on the wireless device, and the wireless device may be located at step 100 proximate an activity sensor capable of communicating a signal indicating some activity. At step 102, the device may receive a signal form the proximate sensor. In preferred embodiments, the sensor and the device may be part of a piconet. In some embodiments, the sensor may actually be a part of the device.

At step 104, the device may utilize the developed application to generate a performance metric from the sensor signal. The performance metric may be presented to the user at step 106. The presentation may be graphical in nature and may make use of a display associated with the wireless device. The presentation could also be auditory in nature and spoken or played to the user.

In some embodiments, the device may include a memory and may save some portion of the performance metric data in that memory. And, the saved data may be retrievable by a different device. For example, a user may have a computer at home capable of retrieving the performance metric data either directly and/or indirectly from the device. Indirect retrieval may involve, for example, utilizing the Public Internet to retrieve the information. Depending on implementation detail, the performance tracking device may communicate the saved metric data as an attachment to an electronic mail message.

For example, if the device is operable as a smartphone and capable of communicating voice calls and data calls, a user of the device may elect to share the metric data with a friend and/or other device via a wide area cellular network using. In some cases, the performance metric data may include GPS and/or other location identifying data. As such, the user may be able to generate a visual and plotted representation of the tracked performance. A software application may take the performance metric information and associated GPS information as an input and output a map that displays a performance route and performance metric information for various points along the route. In some cases, the performance metric information and associated GPS information may actually be converted into an animated sequence by an animator application. As such, the user may be capable of "watching" her performance.

At step 108, the wireless device may receive an indication of an incoming telephone call or data call. The device may indicate the existence of this call to the user, and the user may elect to accept and/or participate in the call at step 110. As mentioned above, the call may be a voice call or a data call. The call may take the form, for example, of an email, a telephone call, an Instant Messaging message, a Short Messaging Service message, a Multimedia Messaging Service message, some other form, and/or a combination thereof.

Whatever the messaging form, the user may elect not to accept the message or may complete his or her interaction with the message. As such, the user may terminate the call at step 112 and resume use of the performance monitoring application and/or launch a different application like an MP3 player.

In various embodiments, the telephones, computers, devices, and/or engines, described above, may take forms including wireless and cordless phones, personal digital assistants, cellular telephones, mobile telephones, laptop computers, hardware, firmware, software, other options having some level of computing capability, and/or a combination thereof.

The methods and systems described herein provide for an adaptable implementation. Although certain embodiments have been described using specific examples, it will be apparent to those skilled in the art that the invention is not limited to these few examples. Note also, that although certain illustrative embodiments have been shown and described in detail herein, along with certain variants thereof, many other varied embodiments may be constructed by those skilled in the art.

The benefits, advantages, solutions to problems, and any element(s) that may cause any benefit, advantage, or solution to occur or become more pronounced are not to be construed as a critical, required, or essential feature or element of the present invention. Accordingly, the present invention is not intended to be limited to the specific form set forth herein, but on the contrary, it is intended to cover such alternatives, modifications, and equivalents, as can be reasonably included within the spirit and scope of the invention as provided by the claims below.

What is claimed is:

1. A pedometer system comprising:
    a pedometer housing component at least partially defining an enclosure;
    a Flash memory located within the enclosure and operable to store an MP3 file;
    a Bluetooth transceiver located within the enclosure and operable to receive a wireless communication from a motion sensor located outside the enclosure, wherein the wireless communication includes information about a step of a user;

a Digital Signal Processor located within the enclosure and communicatively coupled to the Bluetooth transceiver, the Digital Signal Processor operable to utilize the information about the step to generate a performance metric;

a performance output engine operable to provide the user with an indication of the performance metric, wherein the indication comprises an audible message;

an MP3 player communicatively coupled to the Flash memory and operable to play the MP3 file to the user; and a speaker assembly operable to simultaneously output a song represented by the MP3 file and the audible message.

2. The system of claim 1, further comprising a mounting system to secure the housing component to an arm of the user, the mounting system comprising an elastic strap.

3. The system of claim 1, further comprising the sensor, wherein the sensor comprises a local area communication device operable to pair with the Bluetooth transceiver and to output the wireless communication to the Bluetooth transceiver.

4. The system of claim 1, further comprising:

a mounting system to secure the housing component to an arm of the user;

the sensor, wherein the sensor comprises a mounting mechanism operable to secure the sensor in a location remote from the arm; and a headset formed to interact with an ear of the user, the headset comprising the speaker assembly to output a song represented by the MP3 file such that the user can listen to the song.

5. The system of claim 1, wherein the performance metric is selected form a group consisting of a speed metric and a distance metric.

6. The system of claim 1, wherein the performance metric takes into account a user stride length.

7. The system of claim 1, wherein the indication comprises a graphic on a display device.

8. The system of claim 1, further comprising a cellular telephone having an exterior surface at least partially formed from the housing component.

* * * * *

(12) INTER PARTES REEXAMINATION CERTIFICATE (0360th)
United States Patent
White

(10) Number: US 7,062,225 C1
(45) Certificate Issued: *Mar. 27, 2012

(54) PEDOMETER SYSTEM AND METHOD OF USE

(75) Inventor: Russell W. White, Austin, TX (US)

(73) Assignee: Affinity Labs of Texas, LLC, Austin, TX (US)

Reexamination Request:
No. 95/001,488, Nov. 15, 2010

Reexamination Certificate for:
Patent No.: 7,062,225
Issued: Jun. 13, 2006
Appl. No.: 10/917,065
Filed: Aug. 12, 2004

( * ) Notice: This patent is subject to a terminal disclaimer.

Related U.S. Application Data

(63) Continuation of application No. 10/794,137, filed on Mar. 5, 2004, now abandoned.

(51) Int. Cl.
*H04B 5/00* (2006.01)

(52) U.S. Cl. ................. 455/41.2; 455/41.1; 455/550.1; 455/553.1; 600/300; 600/309; 600/316; 600/365

(58) Field of Classification Search ........................ None
See application file for complete search history.

(56) References Cited

To view the complete listing of prior art documents cited during the proceeding for Reexamination Control Number 95/001,488, please refer to the USPTO's public Patent Application Information Retrieval (PAIR) system under the Display References tab.

*Primary Examiner* — Albert J Gagliardi

(57) ABSTRACT

A pedometer system and method of use are disclosed that assist a user in monitoring an athletic endeavor. A system that incorporates teachings of the present disclosure may include, for example, a pedometer housing component at least partially defining an enclosure. A local area wireless transceiver capable of receiving a signal from a motion sensor may be located within the enclosure. A performance engine may also be located within the enclosure and may be communicatively coupled to the local area wireless transceiver. In operation, the performance engine may utilize the signal from the motion sensor to generate a performance metric like average speed or distance traveled. The system may also include an output mechanism such as an audio device capable of presenting the performance metric to a user in an audible message. A device embodying the performance engine may also embody an audio file player such as an MP3 player.

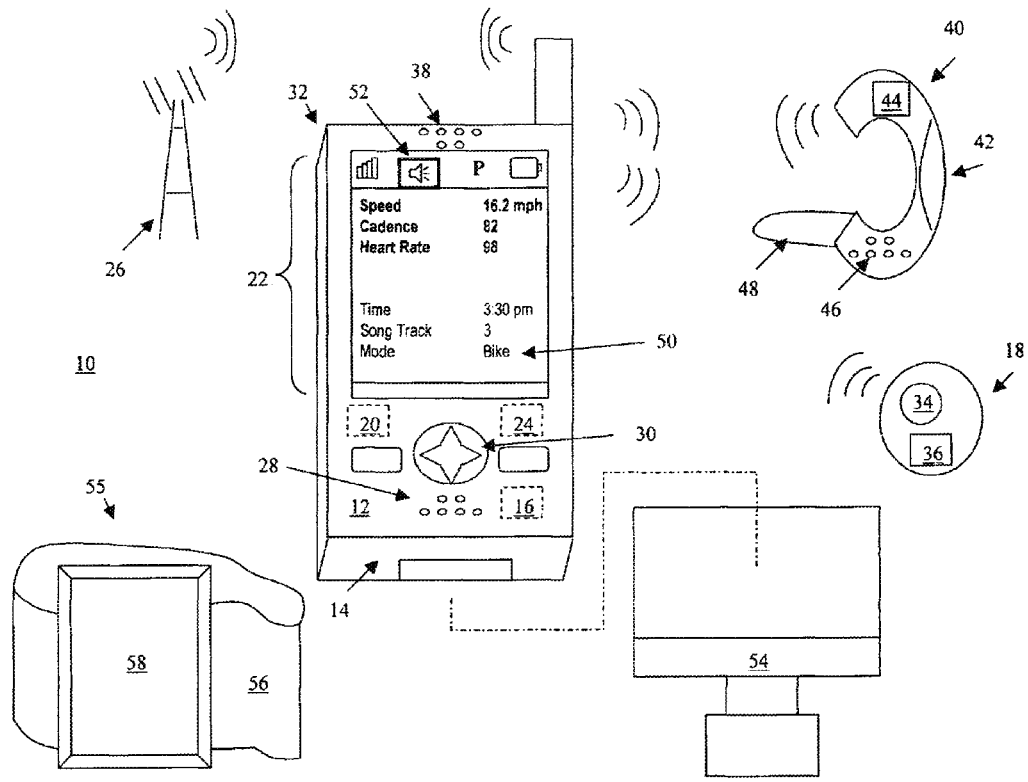

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-8 are cancelled.

* * * * *